Nov. 22, 1960

M. H. PELAVIN 2,960,910

APPARATUS FOR VISUALLY INDICATING OR RECORDING
NUMERICAL VALUES OF CONSTITUENTS OF
FLUIDS UNDER ANALYSIS

Filed June 7, 1957

INVENTOR.
Milton H. Pelavin
BY
ATTORNEYS

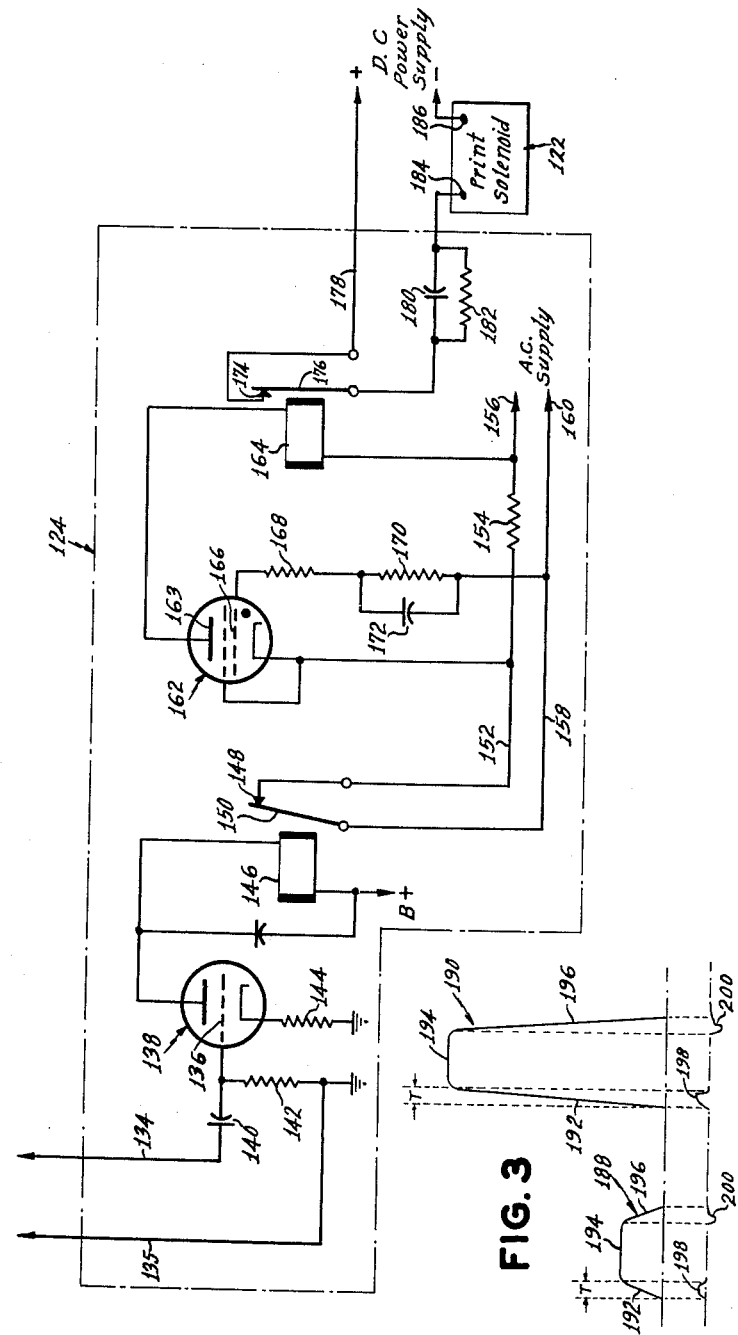

United States Patent Office 2,960,910
Patented Nov. 22, 1960

2,960,910

APPARATUS FOR VISUALLY INDICATING OR RECORDING NUMERICAL VALUES OF CONSTITUENTS OF FLUIDS UNDER ANALYSIS

Milton H. Pelavin, Forest Hills, N.Y., assignor, by mesne assignments, to Technicon Instruments Corporation, Chauncey, N.Y., a corporation of New York Filed June 7, 1957, Ser. No. 664,397

16 Claims. (Cl. 88—14)

The present invention relates, in general, to a recording apparatus and, in particular, to such an apparatus for visually indicating or recording numerical values of constituents of fluids under analysis.

In the copending application of Leonard T. Skeggs, Serial No. 330,211, filed January 8, 1953, now Patent Number 2,797,149, and assigned to the assignee of the present invention, there is disclosed an apparatus for analyzing fluids to determine the quantity of various constituents present in the fluids under analysis. Said apparatus includes a colorimeter and a recorder, responsive to said colorimeter, for providing a graph or curve type of continuous recording for the constituents of the various fluids under analysis. In my copending application, Serial No. 491,913, filed March 3, 1956, now abandoned, for Light Comparitor Circuit, and assigned to the assignee of the present invention, there is disclosed an improved colorimeter circuit for operating such a recorder. In my copending application entitled Means for Providing a Linear Recording of Measurements or Values Which Vary in a Non-Linear Manner, Serial No. 664,352, filed June 7, 1957, which is assigned to the assignee hereof, there is disclosed an improvement in the colorimeter recording apparatus pursuant to which there may be provided a linear recording of the light transmission values of the various fluids under analysis, despite the fact that said light transmission values for the different fluids vary in a non-linear or logarithmic manner, as set forth in Beer's law. The recording provided for in said last-mentioned application is also a continuous graph type recording which is utilized in connection with a calibration curve to ascertain the color concentration values of the various liquids or fluids subjected to the colorimetric analysis and recording. These values represent the quantitative concentrations of the particular constituent, for which the analysis is being made, in the various fluids or liquids.

It is an object of the present invention to obviate the necessity of utilizing a calibration curve in connection with the graph type recording in order to ascertain the numerical values representative of the concentrations of the constituent being analyzed for in the various fluids under analysis.

Another object is to provide a recording apparatus of the described type wherein the numerical values, representative of the concentration of the constituent for which the analysis is being conducted, is directly indicated on the recorder.

Another object is to provide a recording device wherein the numerical values, as set forth in the preceding object, are permanently recorded, as by a printing operation.

A further object is to provide a recording apparatus of the described type which is highly efficient in operation and which can be manufactured and sold at a relatively low cost.

The above and other objects, features and advantages of the present invention will be more fully understood from the following description considered in connection with the accompanying illustrative drawings.

In the drawings which illustrate the best mode presently contemplated of carrying out the invention:

Fig. 2 is a schematic diagram of a delay circuit of said recording apparatus; and Fig. 3 is a wave form chart showing representative wave forms utilized in explaining the operation of the apparatus.

Figure 1:
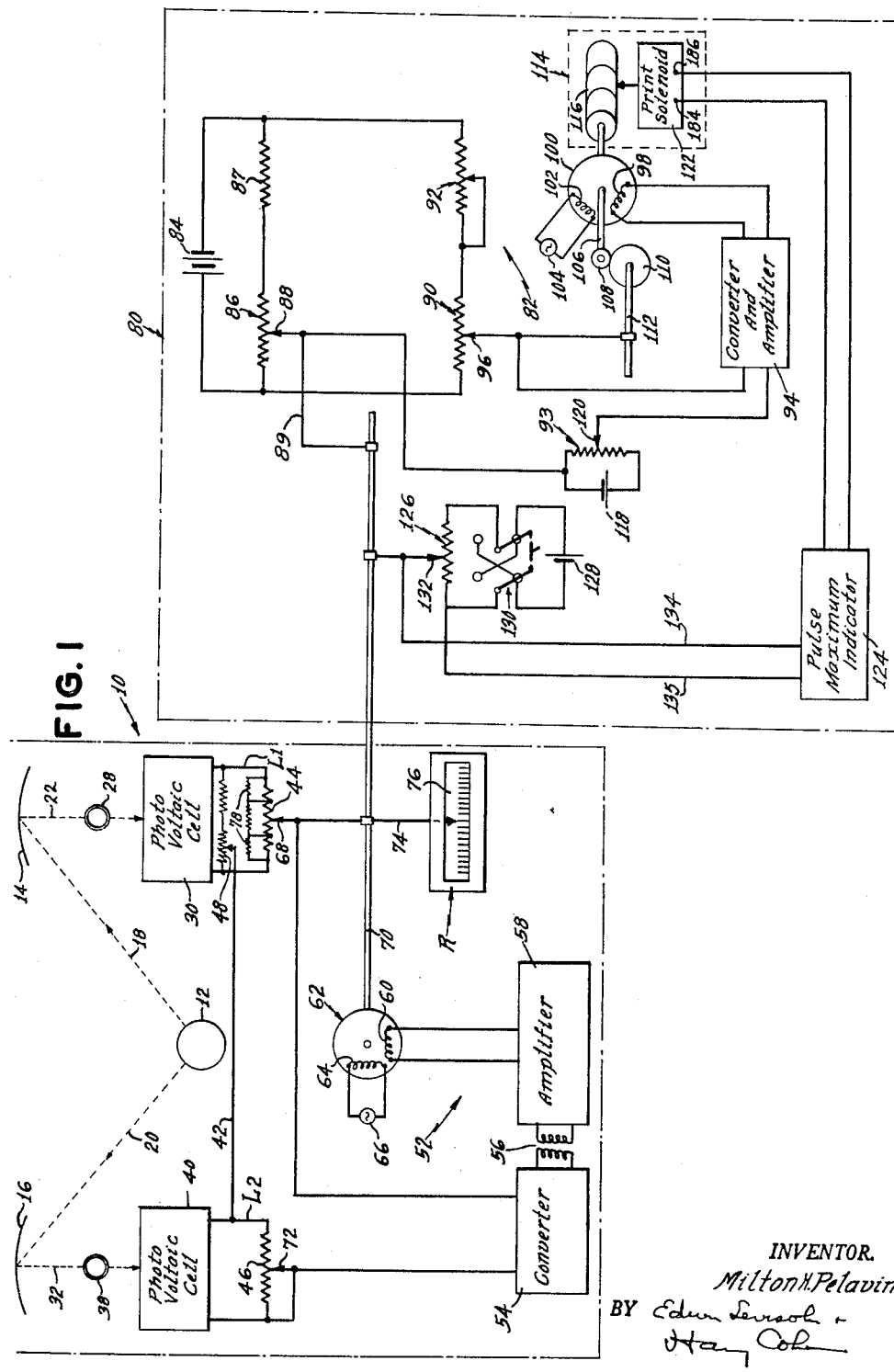
Fig. 1 is a combined block diagram and schematic illustration of a recording apparatus pursuant to the present invention.

The present invention is especially useful in connection with measuring systems of the type wherein a slide wire is operated for balancing a null-type measuring circuit and wherein a recording is made of the movement of the movable arm or tap of the slide wire. As herein shown, provision is made for a colorimeter 10 of the double-beam type, provided with a single light source 12 from which light rays are directed to the laterally spaced reflectors or concave mirrors 14 and 16, as indicated at 18 and 20, respectively. From reflector 14, light is reflected, as indicated by the light path 22, through a suitable holder or container 28, for a standard or reference material, to a photo-voltaic cell 30. The standard or reference may be a colorless blank or solution. Similarly, light is reflected from the concave mirror 16, along the path indicated at 32, for transmission through a suitable container or flow cell 38, for a sample liquid under test, to the photo-voltaic cell 40. The photo-electric devices 30 and 40 are connected in circuit, in series opposition, it being noted that the photo-electric device 30 feeds into a loop L1 and the photo-electric device 40 feeds into a loop L2, and that said loops are interconnected, as at 42, at the negative sides of the devices. The output of the device 30 is developed across the slide wire potentiometer 44, connected in the loop L1, and the output of the photo-electric device 40 is developed across the potentiometer 46 in the loop L2. The potentiometer 46 is a control which is utilized to calibrate the recorder R for 100 percent light transmission through a colorless or no color concentration substance or material. Provision is made in the loop L1 for a potentiometer 48 which functions as a range positioning or zero control, as explained in detail in my copending application, Serial No. 491,913.

As is well known to those skilled in the art, the energization of each of the photo-electric devices 30 and 40 produces a current flow in the output loops L1 and L2, respectively. The current flow in the loop L2 produces a voltage drop across the potentiometer 46 and current flow in the loop L1 produces a voltage drop across the slide wire potentiometer 44. The voltage drop across said potentiometers, or portions thereof, are applied to a conventional balancing system, generally indicated by the reference numeral 52. Said balancing system includes a converter stage 54, which is constituted preferably by a vibrating reed converter. The output from the converter is applied through a transformer 56 to an amplifier stage 58, as illustrated and described in detail in my prior application, Serial No. 491,913. The voltage difference between the taps 68 and 72 of the potentiometers 44 and 46, respectively, are applied to the converter 54. The output of the amplifier 58 is applied to one phase winding 60 of the two phase motor 62, the other winding 64 thereof being energized by the A.C. source 66. The motor 62 operates in response to the voltage applied at stage 54, to drive the contact arm 68 of the slide wire potentiometer 44, said contact arm being ganged with the shaft 70 of the motor 62, to balance the system, at which point there is no voltage applied to the converter 54 and the motor 62 comes to rest.

Provision is made for the conventional recorder R having a recording stylus 74 coupled to the shaft 70 of the motor 62. The stylus duplicates and records the movements of the contact arm 68, to balance the system, on a recording strip or chart 76, driven by a suitable mechanism, to provide a continuous graph type record on the chart 76. The record made by the recorder is the relationship of the light transmitted through the sample to the light transmitted through the standard, this relationship, of course, depending upon the color concentration of the sample in the flow cell 38, which color concentration is directly related to the quantity of the constituent, for which the analysis is being made, which is present in the liquid in the flow cell. This relationship is known as transmittance (TR) and is expressed in percent. According to Beer's law, the logarithm of the light transmitted through a substance or material varies with the color concentration of the substance or material. Consequently, it will be readily apparent that the transmissions through the various samples in the flow cell 38 will vary in a logarithmic or non-linear manner. In my previously identified copending application Serial No. 664,352, provision is made to obtain a linear recording of the transmission measurements which vary in a logarithmic manner. As fully illustrated and described therein, the linear slide wire 44 is converted into a non-linear device by shunting predetermined segments of the latter with the shunts 78, each of which is calculated to provide a predetermined slope for the segment of the slide wire 44 which is shunted thereby. With the slide wire 44 so shunted to convert the latter into a non-linear or logarithmic device, the movements of the slide wire tap 68 represent the logarithm of the light transmission through the various samples so that said light transmissions, although being recorded in a logarithmic manner, are now linearly related to the concentration.

Pursuant to the present invention, the linear transmission-concentration relationship of the tap 68, in effecting the various measurements, due to the presence of the shunts 78, are converted into numerical values which can be presented either visually or which can be printed on a tape or the like, or both types of presentation, namely visual and printed, may be simultaneously provided. This is accomplished through the utilization of the apparatus generally indicated by the reference numeral 80.

The apparatus 80 includes a null type balancing system, generally indicated by the reference numeral 82. Said balancing system 82 includes a voltage source 84 across which there is connected a first branch constituted by a potentiometer 86 in series with a resistor 87, and a second branch constituted by the potentiometer 90 in series with the variable resistor 92. The tap 88 of the potentiometer 86, the latter being hereinafter referred to as the transmitter potentiometer, is coupled to the motor shaft 70, as indicated at 89, so that the tap 88 duplicates the movements of the tap 68 of the slide wire 44. The output of the tap 88 is applied through a zero suppression control circuit 93, the function of which is hereinafter described in detail, to one side of the circuit which is generally designated by the reference numeral 94. It will be understood that circuit 94 is a duplication of the previously described converter 54, transformer 56 and amplifier 58, of the previously identified balancing system 52. The tap 96 of the potentiometer 90, which is hereinafter designated as the receiver potentiometer, is also applied to the balancing circuit 94. Consequently, it will be apparent that the input signal to the balancing circuit 94 is constituted by the difference in potential at the taps 88 and 96.

The circuit 94 feeds its output to one-phase winding 98 of a two-phase motor 100, the other phase winding 102 of which is energized by the A.C. source 104. The shaft 106 of motor 100 mounts a gear 108 which is in mesh with a gear 110, the latter driving a shaft 112 to which the tap 96 of the receiver potentiometer 90 is coupled. The shaft 106 is also coupled to a commercially available revolution counter 114. The counter 114 may, for example and not by way of limitation, be of the type manufactured by the Streeter Amet Co., Chicago, Illinois, and is provided with the conventional counting cylinders 116, which are driven by the shaft 106.

In view of the foregoing, it will be apparent that the balancing system 82 is a servo follower system in which the tap 88 of the transmitter potentiometer directly follows the movements of the tap 68 of the slide wire measuring potentiometer 44. The potential difference between the voltage at the tap 88 and the voltage at the tap 96 of the receiving potentiometer is fed to the balancing circuit 94 and the output of the latter operates the balancing motor 100 which, through the gear reduction train 108—110, operates the receiver potentiometer tap 96 until the voltage at said tap is the same as the voltage at the tap 88 to provide a balance or null condition. The rotation of the motor shaft 106 in effecting the balancing movement of the tap 96 is measured as a numerical count or numerical indication by the count rollers 116 of the counter 114.

In the present form of utilization of the invention, the apparatus is set up to provide a maximum count of 360 on the rollers 116 for 100 percent light transmission through the sample 28. The potentiometer 90, in the present embodiment, is a ten turn or ten revolution potentiometer, the potentiometer 86 being a one turn or one revolution potentiometer. Due to said relationship of a maximum count of 360 and a ten revolution potentiometer 90, the gear ratio of gear 108 to gear 110 is one to thirty-six. The potentiometer 92 functions as a calibration control and, in the present embodiment, is utilized to provide a reading of 360 on the count rollers 116 for a sample in the holder 38 which has 100 percent light transmittance.

In making a blood sugar test in order to determine the amount of sugar present in a blood sample, the colorimetric test is a decolorizing test in which the color concentration of a sample liquid decreases with an increase in the sugar concentration. Consequently, a sample liquid or solution having no sugar whatsoever should have no light transmittance whatsoever. However, it has been found that a solution of liquid having no sugar content whatsoever actually has a light transmittance which may range from 20 to 30 percent. Consequently, in utilizing the apparatus of the present invention for blood sugar tests, it is necessary to eliminate the 20 percent light transmittance reading for for a sample having no sugar and provide a zero count on the counter for a sample having no sugar whatsoever. This function is provided by the previously-identified zero suppression circuit 93 which is constituted by the voltage source or battery 118 connected across the potentiometer 120 to provide a bucking current in the circuit 93 to provide for a zero indication on the rollers 116 when a sample having no sugar is present in the holder 28. More specifically, and assuming that 100 percent transmittance of the light through a sample will provide a reading of 360 on the rollers 116, a sample having no sugar whatsoever would ordinarily record a 20 percent light transmittance on the recording chart 76, and since the stylus directly follows the movements of the tap 68, and since the tap 88 also directly follows the movements of the tap 68 as well as the stylus 74, a 20 percent transmittance reading on the recording chart 76 would appear as a count of 72 on the rollers 116. However, the potentiometer 120 is set to calibrate the counter 114 by introducing enough bucking current in opposition to the current flow from the tap 88 to the circuit 94 to provide a zero count on the rollers 116 instead of a count of 72 thereon when the stylus 74 moves to record a 20 percent light transmittance reading on the record 76. However, since the adjustment of the tap 120 in providing a zero count, instead of a count of 72, would also result in subtracting 72 from the count for a 100 percent concentration reading which, as previously indicated in the present embodiment, would be 360, the calibration potentiometer 92 is adjusted until a 100 percent concentration liquid in the sample holder 28 would provide a reading of 360 on the count rollers 116. It will be apparent that in making the adjustment of the potentiometer 120, a known liquid having a zero blood sugar concentration would be utilized and similarly, in adjusting the 100 percent control 92, a known liquid having a 100 percent light transmittance would be used to adjust the counter for a 100 percent or maximum reading of 360.

In addition to providing for the visual count or indication on the rollers 116, the present invention also has provision to print the count for each sample in the flow cell 38 on a suitable tape or the like. In this connection, it will be understood that the conventional commercially available counter 114 is also provided with a print solenoid 122 to print the reading or count present on the count rollers 116. The color concentration of each liquid sample, as it flows through the flow cell 38 from the previously identified fluid analyzing apparatus, varies from a minimum to a maximum color concentration and then back again to a minimum color concentration. However, the desired reading for each sample is a reading for the numerical value indicative of the maximum color concentration thereof.

The curves provided by the recording stylus 74 have the natural characteristic of a quick rise from a minimum percentage to a maximum percentage, followed by a relatively flat top at said maximum percentage, and then a quick fall from the flat top to return to the minimum percentage. This is due to the fact that each liquid sample which flows through the flow cell 38 initially has a minimum color concentration which rapidly builds up to the maximum color concentration, with the maximum color concentration remaining for a short time and then the color concentration again rapidly diminishes to a minimum. The apparatus of the present invention is operative to delay the operation of the printing solenoid 122 until the sample has reached its maximum concentration so that the print solenoid will be operative or energized at that point to print a numerical value indicative of the maximum concentration of the sample flowing through the flow cell 38. In order to accomplish this result it is necessary to provide a time delay so that the print solenoid will be energized at a predetermined time after the recording stylus 74 begins to move from the minimum concentration point to the maximum concentration point for the particular sample. In order to accomplish this result, provision is made for a pulse maximum indicator circuit 124 which serves to delay the energization of the print solenoid for the required time interval until the maximum transmittance percentage is being recorded by the recording stylus 74.

In this connection, provision is made for a potentiometer 126 connected across a battery 128 by means of a reversing double-pole double-throw switch 130 which is utilized to provide the correct polarity. The tap or arm 132 of the potentiometer 126 is coupled to the drive shaft 70 of the motor 62 so that the tap 132 moves directly with the tap 68 and the recording stylus 74.

The circuit for the maximum pulse indicator 124 is illustrated in Fig. 2. The tap 132 is connected through the lead 134 to the control grid 136 of the tube 138 through a capacitor 140. A resistor 142 connected between the control grid and ground functions as a differentiator circuit with the capacitor 140. One end of the pontentiometer 126 is grounded by means of the lead 135. The tube 138 has a cathode bias resistor 144 by which it is biased to a point near cut-off. The plate circuit of said tube includes a relay coil 146 having the companion contacts 148 and 150 which are engaged in the de-energized condition of the relay. It will be understood that in the near cut-off condition of the tube 138, there is insufficient current flow in the plate circuit thereof to energize the relay coil 146 so that the contacts thereof remain engaged until the coil is energized.

The contact 148 is connected through the lead 152 and a resistor 154, of relatively low resistance, to one terminal 156 of an A.C. power source. The companion contact 150 is connected through a lead 158 to the other terminal 160 of said A.C. source. A thyratron tube 162 has its anode connected through a relay coil 164 to the terminal 156 of the A.C. supply. The cathode of said tube is connected to the lead 152. The control grid 166 of said tube is connected through a series limiting resistor 168 and through the grid leak circuit, constituted by the resistor 170 and the capacitor 172, to the lead 158. The values of the resistor 170 and the capacitor 172 are selected to provide a predetermined time constant, such as, for example and not by way of limitation, 75 seconds.

The relay coil 164 is provided with the companion contacts 174 and 176 which are engaged in the energized condition of the relay. The stationary contact 174 is connected by means of the lead 178 to the positive terminal of a suitable D.C. power supply. The companion movable contact 176 is connected to the parallel combination of the capacitor 180 and the resistor 182, which combination is in series between the movable contact 176 and one terminal 184 of the previously mentioned solenoid 122. The other terminal 186 of the print solenoid is connected to the negative terminal of the D.C. power supply.

It will be noted that the anode 163 of the tube 162 is connected through the relay coil 164 to the terminal 156 of the A.C. power supply and, with the relay 146 of the tube 138 deenergized, the cathode of the tube 162 is connected to the other terminal 160 of said A.C. power supply. Consequently, the tube 162 is in a normally conducting condition because its anode is positive to its cathode during each positive half cycle of the A.C. power supply, it being noted that there is no bias between the control grid and the cathode thereof because, with the contacts 148 and 150 closed, both the control grid and the cathode are at the same potential, being both connected to the terminal 160 of the A.C. power supply. Consequently, the tube 162, in said condition thereof, functions as a rectifier and provides an average D.C. current flow from the plate 163 through the relay coil 164 which is sufficient to energize said coil to maintain the contacts 174, 176 in engagement. With the contacts 174 and 176 in engagement, the capacitor 180 is charged to the same voltage that is developed across the resistor 182. However, the resistance of resistor 182 is so large, compared to the resistance of the print solenoid 122, that most of the voltage of the D.C. power supply is developed across the resistor 182 and only a small fraction thereof, which is insufficient to energize the print solenoid 122, appears across the latter. Therefore, it will be apparent that the print solenoid, in the condition described, is inoperative.

As previously described, the tap 132 of the potentiometer 126 directly follows the movements of the tap 68 of the slide wire potentiometer 44 and of the recording stylus 74. Further, as previously indicated, it is characteristic of the successive liquid samples which flow through the flow cell 38 in the form of a continuous stream of liquid, that the leading portion of each liquid sample has a minimum color concentration, which then increases quite rapidly to a maximum color concentration, which after a time rapidly falls to a minimum color concentration to provide corresponding movement in the motor shaft 70 and the various taps coupled thereto. The resultant movement of the tap 132 across the potentiometer 126, which is connected across the battery 128, provides a voltage pulse which is representative of the change in the color concentration during the flow of the sample through the flow cell 38. Such pulses are illustrated in Fig. 3 at 188 and at 190 for different samples flowing through the flow 38. While differing in amplitude, it will be noted that each pulse has a comparatively rapid rise 192, which occurs during the time interval designated by T, a relatively flat top 194, representative of the period during which the maximum or peak color concentration of the sample is passing through the flow cell 38, and a relatively rapid decline 196 complementary to the rapid rise 192.

The pulses resulting from the movement of the tap 132 are applied to the differentiator circuit 140—142. The components of the differentiator circuit are calculated to provide a time constant which is a fraction of the rise time T of the pulses, it being understood, in this connection, that the rise time T in all pulses generated by movement of the tap 132 is the same, regardless of the amplitude of said pulses. For example and not by way of limitation, the differentiator circuit may have a time constant which is one-fifth of the rise time T of the pulses. Consequently, the differentiator circuit provides an output which is responsive only to the rapid changes in the pulses, namely, the pulse rises 192 or the pulse falls 196, and provides at the output thereof the positive and negative pulses 198 and 200, respectively, said positive pulses 198 constituting trigger pulses for the tube 138.

As previously indicated, the tube 138 is normally operating near cut-off so that a positive trigger pulse 198 fed to the control grid 136 thereof causes the tube to momentarily conduct during the time duration of the trigger pulse, whereby to energize the relay coil 146 during said time duration. The energization of the relay coil 146 results in the disengagement or opening of the contacts 148 and 150, whereby to interrupt the connection between the cathode of tube 162 and the A.C. supply terminal 160, with the associated control grid 166, however, remaining at the potential of the terminal 160 of said A.C. power supply. The cathode is now at the potential of terminal 156 of the A.C. supply, less the voltage drop across the resistor 154, which is a relatively small resistor, so that the cathode is essentially at the same potential as the plate 163 of said tube 162. Consequently, there will be no current flow from the cathode to the plate 163, since they are both at the same potential. However, during positive half-cycles of the A.C. power supply, there will now be a current flow from the cathode to the control grid 166, since said electrodes are connected to different terminals of said A.C. power supply. The resistor 168 serves to limit the grid current flow and the capacitor 172 will be charged to the voltage drop developed across its associated resistor 170, so that said components 170 and 172 function to provide substantially a grid leak bias or an average bias for the control grid 166 resulting from the flow of current therefrom during the positive half-cycles of the A.C. supply. The capacitor 172 charges very rapidly through the relatively low internal resistance of the tube 162 and the relatively low resistance of the limiting resistor 168, so that it has a very small charging time. The resistance of resistor 170 is relatively large so as to provide a relatively long time constant. For example, and not by way of limitation, the time constant of the combination 170—172 may be in the order of 75 seconds. This time constant is quite large, as compared to the time interval T which represents the duration of the trigger pulses 198. For example, and not by way of limitation, the trigger pulses 198 may have a time duration of one second, as compared to the 75 second time-constant of the circuit 170—172. The reason for this relationship is hereinafter described in detail.

With current flow in tube 162 cut off between its cathode and its plate 163 by virtue of the disengagement of the contacts 148 and 150 of the relay 146, the plate relay 164 is de-energized, whereby to disengage or open the contacts 174—176 thereof so as to interrupt the connection between the parallel circuit 180—182 and the positive terminal of the D.C. power supply. The charge across the capacitor 180 now discharges or bleeds across its parallel resistor 182, the print solenoid 184 however remaining de-energized.

Assuming now that the trigger pulse 198 introduced to the first stage 138 has a time duration of one second and, further, that the rate of charge of the capacitor 172 is less than one second, it will be apparent that the full charge will develop across the capacitor 172 during the period of energization of the relay 146, which is the same as the time duration of the trigger pulse, namely one second. At the end of said one second duration of the pulse 198, the tube 138 returns to its original cut-off or non-conducting condition, so that the contacts 148 and 150 close to again establish a potential difference between the cathode and plate of the tube 162 during the positive half cycles of the A.C. power supply. However, the thyratron tube 162 remains cut off because the voltage charge across its capacitor 172 biases the tube to its cut-off condition. However, the capacitor 172 now begins to discharge across its associated resistor 170 and, due to the relatively long time constant thereof which, as previously indicated, may be in the order to 75 seconds, the tube 162 remains cut off for substantially the 75 seconds required to discharge the capacitor 172 across the resistor 170 to a point where the bias on the control grid is sufficiently low so that the tube 162 is again rendered conductive.

It will be apparent that during the period that the capacitor 172 rendered the tube 162 non-conductive, the charge across the capacitor 180 has dissipated or bled-off across its associated resistor 182, so that when the tube 162 is again rendered conductive, the capacitor 180 is in a discharged condition. As soon as the tube 162 becomes conductive again, the relay 164 is energized to again effect the engagement of its contacts 174 and 176. This now causes the capacitor 180 to be reconnected to the positive terminal of the D.C. power supply, and the initial surge of the current flow through the capacitor 180 provides an A.C. component, in the form of a pulse, which rises to the output voltage of the D.C. power supply and is passed through the capacitor 180 to the print solenoid 122. Said surge pulse is of a magnitude sufficient to energize the print solenoid 122, during the duration thereof, to print the count on the rollers 116, on a tape or the like. However, as soon as the capacitor 180 is again charged, the voltage available at the print solenoid is insufficient to energize the latter and the print solenoid is de-energized. Consequently, it will be apparent that, as a result of the delay introduced by the time constant of the resistor 170 and the capacitor 172. The printing operation occurs during the flat portion 194 of the pulses 188 and 190, it being understood that said flat portions are in existence during a 75 second period after the initial period T and, as previously indicated, said flat portions represent the time period during which the maximum color concentration of each liquid sample is present in the flow cell 38.

While I have shown and described the preferred embodiments of my invention, it will be understood that various changes may be made in the idea or principles of the invention within the scope of the appended claims.

Having thus described my invention, what I claim and desire to secure by Letters Patent is:

1. Apparatus of the character described comprising a colorimeter operable to obtain measurements of the light transmittances through sample liquids having means to provide for a linear variation in said measurements, said means comprising a comparison, null-type balancing circuit including two photo electric devices having companion resistances across which voltage outputs responsive, respectively, to light from a reference medium and to the light from the sample are developed, said photoelectric device which is responsive to the light from the reference medium, including a variable potentiometer across which the companion voltage output is developed, a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movements of the tap of said potentiometer by said motor balances non-linear voltages from said other photo-electric device and means operable in response to the measuring operations of said colorimeter to provide numerical values of the respective concentrations of a predetermined constituent of said sample liquids, said light transmittances being functions of said concentrations, respectively, and means to record said numerical values, said last mentioned means comprising a second null-type circuit, a second variable potentiometer included in said last mentioned circuit, said motor being operatively connected to said variable potentiometer for adjusting the latter to unbalance said last mentioned circuit proportionately to the adjustment of said first mentioned potentiometer to balance said first mentioned circuit, and means operable in response to the unbalance of said last mentioned circuit to balance the same.

2. Apparatus of the character described comprising a colorimeter operable to obtain measurements of the light transmittances through sample liquids, means operable under the control of said colorimeter to provide for a linear variation in said measurements, said means comprising a comparison, null-type balancing circuit including two photo-electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said outputs to adjust said potentiometer and thereby balance said circuit, said variable potentiometer comprising a length of wire having a plurality of resistances tapped across portions of its length to provide a non-linear voltage distribution across said potentiometer, whereby linear movements of the tap of said potentiometer by said motor balances non-linear voltages from said other photo-electric device and means operable in response to the measuring operations of said colorimeter to provide numerical values of the respective concentrations of a predetermined constituent of said sample liquids, said light transmittances being functions of said concentrations, respectively, and means to record said numerical values, said last mentioned means comprising a second null-type circuit, a second variable potentiometer included in said last mentioned circuit, said motor being operatively connected to said variable potentiometer for adjusting the latter to unbalance said last mentioned circuit proportionately to the adjustment of said first mentioned potentiometer to balance said first mentioned circuit, and means operable in response to the unbalance of said last mentioned circuit to balance the same, and means to record said light transmittance measurements.

3. In a colorimeter apparatus, means to obtain measurements of the light transmittances through sample liquids said means comprising a comparison, null-type balancing circuit including two photo-electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, and means responsive to each balancing operation of said motor for obtaining a corresponding numerical value of the concentration of a predetermined constituent in the sample under measurement which determines the light transmittance of said sample, said last mentioned means comprising a second null-type circuit, a second variable potentiometer included in said last mentioned circuit, said motor being operatively connected to said variable potentiometer for adjusting the latter to unbalance said last mentioned circuit proportionately to the adjustment of said first mentioned potentiometer to balance said first mentioned circuit, and means operable in response to the unbalance of said last mentioned circuit to balance the same.

4. In a colorimeter apparatus, means to obtain measurements of the light transmittances through sample liquids said means comprising a comparison, null-type balancing circuit including two photo electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movements of the tap of said potentiometer by said motor balances non-linear voltages from said other photo-electric device and means responsive to each balancing operation of said motor for obtaining a corresponding numerical value of the concentration of a predetermined constituent in the sample under measurement which determines the light transmittance of said sample, said last-mentioned means comprising a second null-type balancing circuit including a second variable potentiometer to which said motor is operatively connected for adjusting said second variable potentiometer to unbalance said second null-type circuit in response to the balancing operation of said motor, a second motor operable to balance said second balancing system, and a counter operable to provide a numerical count in accordance with the balancing operation of said second motor.

5. In a colorimeter apparatus, means to obtain measurements of the light transmittances through sample liquids said means comprising a comparison, null-type balancing circuit including two photo-electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movements of the tap of said potentiometer by said motor balances non-linear voltages from said other photo-electric device and means responsive to each balancing operation of said motor for obtaining a corresponding numerical value of the concentration of a predetermined constituent in the sample under measurement which determines the light transmittance of said sample, said last-mentioned means comprising a second null-type balancing circuit including a second variable potentiometer to which said motor is operatively connected for adjusting said second variable potentiometer to unbalance said second null-type circuit in response to the balancing operation of said motor, a second motor operable to balance said second balancing system, and a counter operable to provide a numerical count in accordance with the balancing operation of said second motor, and means for calibrating said second balancing circuit to provide a predetermined maximum count on said counter for 100 percent light transmittance.

6. In a colorimeter apparatus, means to obtain measurements of the light transmittances through sample liquids said means comprising a comparison, null-type balancing circuit including two photo electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movements of the tap of said potentiometer by said motor balances non-linear voltages from said other photo-electric device and means responsive to each balancing operation of said motor for obtaining a corresponding numerical value of the concentration of a predetermined constituent in the sample under measurement which determines the light transmittance of said sample, said last-mentioned means comprising a second null-type balancing circuit including a second variable potentiometer to which said motor is operatively connected for adjusting said second variable potentiometer to unbalance said second null-type circuit in response to the balancing operation of said motor, a second motor operable to balance said second balancing system, and a counter operable to provide a numerical count in accordance with the balancing operation of said second motor, and means for calibrating said second balancing circuit to provide a zero count on said counter.

7. In a colorimeter apparatus, means to obtain measurements of the light transmittances through sample liquids said means comprising a comparison, null-type balancing circuit including two photo-electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movements of the tap of said potentiometer by said motor balances non-linear voltages from said other photo-electric device and means responsive to each balancing operation of said motor for obtaining a corresponding numerical value of the concentration of a predetermined constituent in the sample under measurement which determines the light transmittance of said sample, said last-mentioned means comprising a second null-type balancing circuit including a second variable potentiometer to which said motor is operatively connected for adjusting said second variable potentiometer to unbalance said second null-type circuit in response to the balancing operation of said motor, a second motor operable to balance said second balancing system, and a counter operable to provide a numerical count in accordance with the balancing operation of said second motor, and means to print said numerical count.

8. In a colorimeter apparatus, means to obtain measurements of the light transmittances through sample liquids said means comprising a comparison, null-type balancing circuit including two photo-electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movements of the tap of said potentiometer by said motor balances non-linear voltages from said other photo-electric device and means responsive to each balancing operation of said motor for obtaining a corresponding numerical value of the concentration of a predetermined constituent in the sample under measurement which determines the light transmittance of said sample, said last-mentioned means comprising a second null-type balancing circuit including a second variable potentiometer to which said motor is operatively connected for adjusting said second null-type circuit in response to the balancing operation of said motor, a second motor operable to balance said second balancing system, and a counter operable to provide a numerical count in accordance with the balancing operation of said second motor, and means to print said count, said last mentioned means comprising a print solenoid in said counter, and means operable under the control of said first mentioned motor for delaying the energization of said print solenoid until the sample liquid is present in maximum concentration in said colorimeter.

9. In a colorimeter apparatus, means to obtain measurements of the light transmittances through sample liquids wherein said measurements vary in a linear manner, said means comprising a comparison, null-type balancing circuit including two photo-electric devices having companion resistances across which voltage outputs responsive respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, a second null-type balancing circuit comprising a bridge circuit having a transmitting potentiometer and a receiving potentiometer, said transmitting potentiometer being operable in response to the balancing operation of said motor, a second motor operable in response to a potential difference between the taps of said potentiometers to operate said receiving potentiometer to balance said bridge circuit, and a counter operable to convert the balancing operation of said second motor into numerical count.

10. In a colorimeter apparatus, means to obtain measurements of the light transmittances through sample liquids wherein said measurements vary in a linear manner, said means comprising a comparison, null-type balancing circuit including two photo electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, a second null-type balancing circuit comprising a bridge circuit having a transmitting potentiometer and a receiving potentiometer, said transmitting potentiometer being operable in response to the balancing operation of said motor, a second motor operable in response to a potential difference between the taps of said potentiometers to operate said receiving potentiometer to balance said bridge circuit, and a counter operable to convert the balancing operation of said second motor into a numerical count, and means to print said numerical count.

11. In a colorimeter apparatus, means to obtain measurements of the light transmittances through sample liquids wherein said measurements vary in a linear manner, said means comprising a comparison, null-type balancing circuit including two photo electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, a second null-type balancing circuit comprising a bridge circuit having a transmitting potentiometer and a receiving potentiometer, said transmitting potentiometer being operable in response to the balancing operation of said motor, a second motor operable in response to a potential difference between the taps of said potentiometers to operate said receiving potentiometer to balance said bridge circuit, and a counter operable to convert the balancing operation of said second motor into a numerical count, and means to print said numerical count, said last mentioned means comprising a print solenoid in said counter and means for delaying the energization of said print solenoid until the sample liquid is present in maximum concentration in said colorimeter.

12. In a colorimeter apparatus of the type which operates in accordance with the comparison of the light transmittance of a liquid sample under analysis in respect to the concentration of a substance therein, with light transmittance from a reference medium and wherein the color density of the sample varies between terminal minimum and maximum values during the colorimetric examination thereof, comprising two photo-electric devices having companion resistances across which voltage outputs responsive, respectively, to light from a reference medium and to the light from the sample are developed, said photo-electric device which is responsive to the light from the reference medium, including a variable potentiometer across which the companion voltage output is developed, a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movement of the tap of said potentiometer by said motor balances non-linear voltages from said other photo-electric device, and a recorder provided with a stylus actuated by said motor concomitantly with the balancing adjustment of said variable potentiometer for making a linear record of the light transmittance of the sample liquid, and means in addition to said stylus operable to indicate a terminal value of the color density numerically representative of the concentration of said substance in said liquid, said last mentioned means comprising a second null-type circuit, a second variable potentiometer included in said last mentioned circuit, said motor being operatively connected to said variable potentiometer for adjusting the latter to unbalance said last mentioned circuit proportionately to the adjustment of said first mentioned potentiometer to balance said first mentioned circuit, and means operable in response to the unbalance of said last mentioned circuit to balance the same, and a numerical counter operable under the control of said last mentioned means.

13. In colorimeter apparatus of the type which operates in accordance with the comparison of the light transmittance of a liquid sample under analysis in respect to the concentration of a substance therein, with light transmittance from a reference medium and wherein the color density of the sample varies between terminal minimum and maximum values during the colorimetric examination thereof, comprising two photo-electric devices having companion resistances across which voltage outputs responsive, respectively, to light from a reference medium and to the light from the sample are developed, said photo-electric device which is responsive to the light from the reference medium, including a variable potentiometer across which the companion voltage output is developed a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movement of the tap of said potentiometer by said motor balances non-linear voltages from said other photo-electric device, and means operable to indicate a terminal value of the color density numerically representative of the concentration of said substance in said liquid, said last mentioned means comprising a second null-type circuit, a second variable potentiometer included in said last mentioned circuit, said motor being operatively connected to said variable potentiometer for adjusting the latter to unbalance said last mentioned circuit proportionately to the adjustment of said first mentioned potentiometer to balance said first mentioned circuit, and means operable in response to the unbalance of said last mentioned circuit to balance the same, and a numerical counter operable under the control of said last mentioned means.

14. In colorimeter apparatus of the type which operates in accordance with the comparison of the right transmittance of a liquid sample under analysis in respect to the concentration of a substance therein, with light transmittance from a reference medium and wherein the color density of the sample varies between terminal minimum and maximum values during the colorimetric examination thereof, comprising two photo-electric devices having companion resistances across which voltage outputs responsive, respectively, to light from a reference medium and to the light from the sample are developed, said photo-electric device which is responsive to the light from the reference medium, including a variable potentiometer across which the companion voltage outlet is developed a motor operable in accordance with the difference between said voltage outputs to adjust said potentiometer and thereby balance said circuit, said variable potentiometer comprising a length of wire having a plurality of resistances tapped across portions of its length to provide a non-linear voltage distribution across said potentiometer, whereby linear movement of the tap of said potentiometer by said motor balances non-linear voltages from said other photo-electric device, and means operable to indicate a terminal value of the color density numerically representative of the concentration of said substance in said liquid, said last mentioned means comprising a second null-type circuit, a second variable potentiometer included in said last mentioned circuit, said motor being operatively connected to said variable potentiometer for adjusting the latter to unbalance said last mentioned circuit proportionately to the adjustment of said first mentioned potentiometer to balance said first mentioned circuit, and means operable in response to the unbalance of said last mentioned circuit to balance the same, printing means operable under the control of said last mentioned means for recording said numerical terminal value, and means operable under the control of said first mentioned motor for preventing operation of said printing means until said terminal value is determined.

15. Colorimeter apparatus for comparing the light transmittance of a liquid sample under analysis as to the concentration of a substance in the liquid sample, with light transmittance of a reference medium, the color density of the sample varying between terminal minimum and maximum values during the colorimetric examination thereof, said colorimeter apparatus comprising, two photo-electric devices, resistors, electrically connected to said devices, across which voltages are developed in response to light transmitted through said reference medium and to the light transmitted through said sample under analysis; a variable potentiometer connected across said resistor which is connected to said photo-electric device which is responsive to the light transmitted through said sample under analysis; balancing means to combine the voltages developed across said resistors so as to develop a difference voltage; a motor operable in accordance with said developed difference voltage to adjust said potentiometer so as to reduce said difference voltage to a value insufficient to operate said motor; said variable potentiometer comprising a length of resistance wire and a plurality of resistors shunted across said resistance wire along the length thereof; said potentiometer thereby providing a voltage output which varies linearly in response to a non-linear voltage from said photo-electric device exposed to light transmitted through said liquid sample; a recorder having a recording stylus, actuated by said motor simultaneously with the balancing adjustment of said variable potentiometer, for making a linear record of the light transmittance of the sample liquid; a null-type balanced bridge circuit; a second variable potentiometer included in said last mentioned bridge circuit, said motor being operatively connected to said last mentioned variable potentiometer for adjusting the latter to unbalance said last mentioned bridge circuit proportionately to the adjustment of said first mentioned potentiometer to electrically balance said first mentioned balancing means, electromechanical means operable in response to the electrical unbalance of said last mentioned circuit to balance the same; means to develop a voltage in response to operation of said electromechanical means, a numerical counter conditioned by said electromechanical means; means responsive to said last mentioned developed voltage to cause the printing of the count of said counter and delay means for delaying the printing until said developed voltage attains a steady value.

16. Colorimeter apparatus for comparing the light transmittance of a liquid sample under analysis as to the concentration of a substance in the liquid sample under analysis with the light transmittance of a reference liquid medium, the color density of the sample varying between terminal minimum and maximum values during the colorimetric examination thereof, said colorimeter apparatus comprising, two photo-electric devices; a first resistor, connected to one of said devices, across which a voltage is developed in dependence upon the light transmitted through said liquid reference medium and directed upon said one device; a resistive network connected to the other photoelectric device, across which voltages are developed in linear relation to the concentration of the substance in the liquid sample under analysis as light is transmitted through said sample and directed upon said second photo-electric device; means for combining said voltages derived from said first resistor and network to produce a difference voltage; electromechanical means responsive to the difference voltage for varying the voltage derived from said network so as to reduce the difference voltage effectively to zero; a normally balanced bridge circuit; means operatively connected to said electromechanical means for unbalancing said bridge circuit in proportion to and simultaneously with, movement of said electromechanical means, the unbalancing of said bridge producing across output terminals thereof a voltage representative of the unbalance; means in series with said output terminals for adding a predetermined fixed voltage; a motor; a counter driven by said motor; means for applying said added voltages to said motor to cause movement thereof in accordance with the added voltages applied thereto; a source of steady voltage; a variably tapped resistor connected in shunt to said source of steady voltage; means operatively connecting said tap with said electromechanical means whereby said tap is moved simultaneously with movement of said electromechanical means; a printer for printing the count of said counter; means responsive to the voltage developed at said tap for causing said printer to print the count of said counter; and means for delaying the printing by said printer until the voltage at said tap has reached a steady, maximum value corresponding to a maximum value of color density of the liquid sample under analysis.

References Cited in the file of this patent

UNITED STATES PATENTS

| | | |
|---|---|---|
| Re. 23,023 | Wolf et al. | Aug. 3, 1948 |
| 1,919,858 | Pettingill | July 25, 1933 |
| 2,019,871 | Pettingill et al. | Nov. 5, 1935 |
| 2,114,330 | Borden | Apr. 19, 1938 |
| 2,119,195 | Bagno | May 31, 1938 |
| 2,232,373 | Dorst | Feb. 18, 1941 |
| 2,326,878 | Mueller | Aug. 17, 1943 |
| 2,594,514 | Sweet | Apr. 29, 1952 |
| 2,655,040 | Peterson | Oct. 13, 1953 |
| 2,679,010 | Luft | May 18, 1954 |
| 2,694,335 | Albright et al. | Nov. 16, 1954 |
| 2,772,598 | Hotine | Dec. 4, 1956 |
| 2,812,481 | Roosdorp | Nov. 5, 1957 |
| 2,831,095 | Matthew | Apr. 15, 1958 |

FOREIGN PATENTS

| | | |
|---|---|---|
| 749,514 | Great Britain | May 30, 1956 |